United States Patent [19]

Campbell et al.

[11] 4,362,361

[45] Dec. 7, 1982

[54] COLLIMATED BEAM MANIFOLD WITH THE NUMBER OF OUTPUT BEAMS VARIABLE AT A GIVEN OUTPUT ANGLE

[75] Inventors: Cecil W. Campbell; Robert B. Owen, both of Huntsville, Ala.

[73] Assignee: The United States of America as represented by the Administrator of the National Aeronautics and Space Administration, Washington, D.C.

[21] Appl. No.: 187,106

[22] Filed: Sep. 15, 1980

[51] Int. Cl.³ ............................................. G02B 27/14
[52] U.S. Cl. ................................................... 350/171
[58] Field of Search ................ 350/171, 169, 170, 173, 350/174, 291, 299; 427/165, 166; 362/259

[56] References Cited

U.S. PATENT DOCUMENTS

| | | | |
|---|---|---|---|
| 2,384,209 | 9/1945 | Sukumlyn | 427/166 |
| 3,485,552 | 12/1969 | Adler | 350/169 |
| 3,498,693 | 3/1970 | Fein et al. | 350/169 |
| 3,501,222 | 3/1970 | Herriott et al. | 350/171 |
| 3,501,223 | 3/1970 | Rack | 330/171 |
| 3,711,188 | 1/1973 | Zehnpfennig | 350/171 |
| 3,879,109 | 4/1975 | Thomas | 350/169 |
| 4,035,070 | 7/1977 | Hammond | 355/67 |

FOREIGN PATENT DOCUMENTS 52-5540  1/1977  Japan .................................. 350/299

OTHER PUBLICATIONS

Murray, W. A., *Western Electric Tech. Dig.*, No. 15, Jul. 1969, pp. 33-34.

*Primary Examiner*—Jon W. Henry
*Attorney, Agent, or Firm*—Joseph H. Beumer; John R. Manning; L. D. Wofford, Jr.

[57] ABSTRACT

An optical manifold transforms a collimated beam, such as a laser beam, into a plurality of parallel beams having uniform intensity or having a desired intensity ratio. The manifold (10) comprises an optical substrate (12) coated on its rear surface (13) with a fully reflective layer (14) and on its front surface (15) with a partially reflecting layer (20) having a reflectivity gradient. An input collimated beam (30) entering the rear surface (13) and impinging on the front surface (14) will be reflected, multiple (32-40) between the front and rear surfaces producing a plurality of parallel beams (42, 44, 46, 48) that emerge from the front surface. The intensities of the emerging beams will have a relationship that depends on the reflectivity ($R_1$, $R_2$, $R_3$, $R_4$, and $R_5$) of the front surface at the points where the beams emerge. By properly selecting the reflectivity gradient, the emerging beams will have uniform intensity or a desired intensity ratio.

2 Claims, 2 Drawing Figures

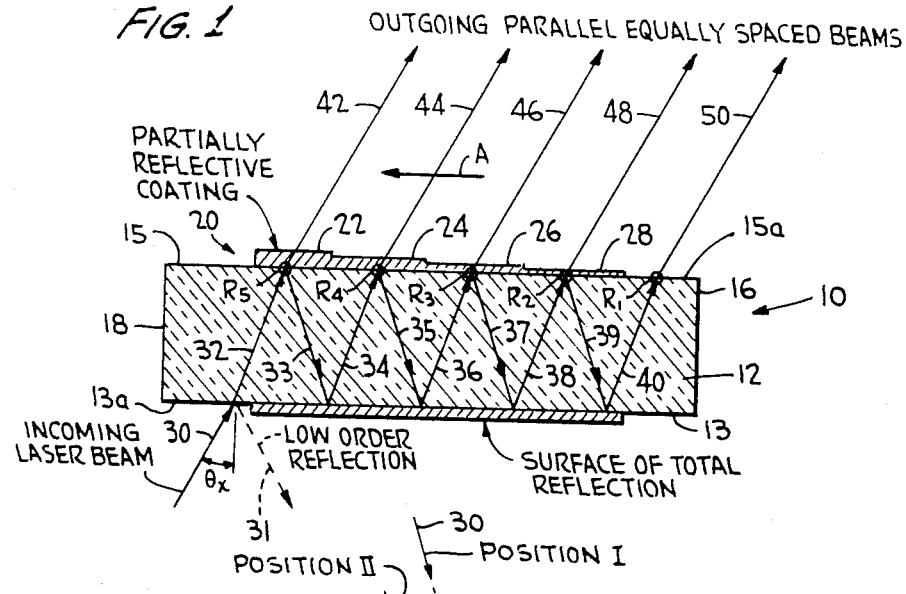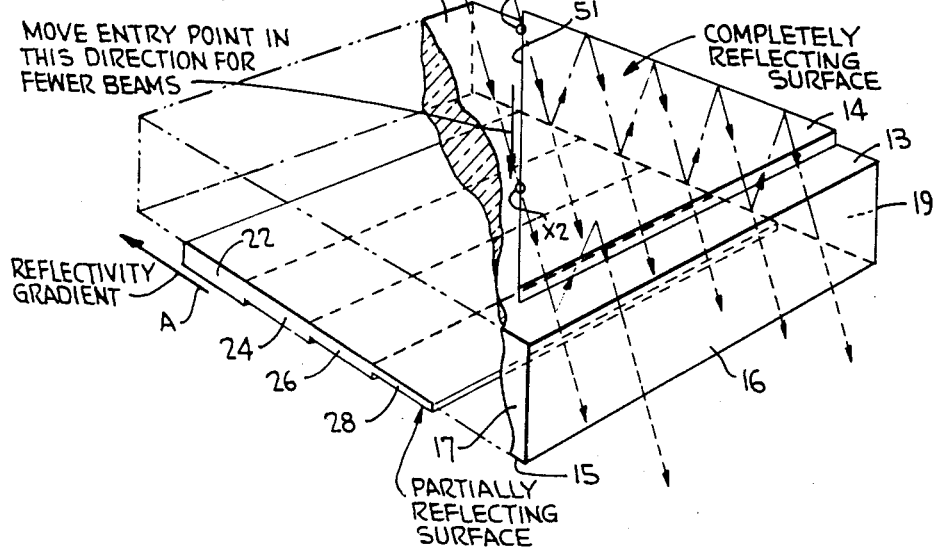

COLLIMATED BEAM MANIFOLD WITH THE NUMBER OF OUTPUT BEAMS VARIABLE AT A GIVEN OUTPUT ANGLE

DESCRIPTION

ORIGIN OF THE INVENTION

This invention was made by employees of the United States Government and may be manufactured and used by and for the Government for governmental purposes without payment of any royalties thereon or therefor.

TECHNICAL FIELD OF THE INVENTION

The present invention generally relates to an optical manifold and to a method for using the same to transform a collimated beam, such as a laser beam, into a plurality of beams having a preselected intensity ratio (e.g., all having equal intensity). Such a manifold is useful in two-phase fluid flow measurements, aerosol sizing, security systems, laboratory photogrammetry, laser Doppler velocimetry, interferometry and holography.

BACKGROUND ART

U.S. Pat. No. 4,035,070 discloses optical modulation apparatus for generating a structured charge-discharge pattern on a photoreceptor. Such apparatus produces a plurality of generally parallel, collimated radiation beams of uniform intensity from a single collimated beam input. The apparatus includes an optical cavity of a medium, generally transparent to the input radiation, and configured with opposite parallel surfaces to which uniform reflecting surfaces are applied. One of the surfaces is fully reflecting and the other is partially reflecting. Over the partially reflective surface is a continuously variable (wedge) filter. When a single collimated beam is injected into the cavity through a side thereof such that the beam is incident on the partially reflective surface, the beam will be reflected recursively between the surfaces. After each reflection from the partially reflective surface, the beam is less intense due to the transmission into the wedge of a fraction of the radiation incident on the partially reflective surface. The beams transmitted into the wedge are substantially parallel, but the intensity of the beam decreases in the direction of propagation of the multiple reflections.

The function of the optical wedge is to inversely attenuate the beams transmitted into the wedge so that each beam emerging from the wedge will have the same intensity. U.S. Pat. No. 3,711,188 discloses an optical system having a uniform fully reflective surface inclined relative to a uniform, partially reflective surface. An image of a device to be displayed is injected into the space between the mirrors and onto the fully reflective surface. Light incident on the last mentioned surface is multiple reflected between the surfaces producing a plurality of rays that emerge from the partially reflective surface and provide a display of the item. By reason of the inclined relationship between the two surfaces, the emerging light is not parallel and the intensity is not uniform.

Many applications exist for an optical manifold capable of creating a plurality of parallel, uniformly spaced beams of equal itensity or having a predetermined intensity ratio. The '070 patent described above discloses a technique for achieving a plurality of parallel beams of equal intensity, but such technique is not efficient by reason of the attenuation of the transmitted beam introduced by the optical wedge. Furthermore, the wedge will introduce some non-uniformity in the spacing of the emerging beams. More importantly, however, it is not possible to change the number of exiting beams in the '070 patent except by varying the angle of incidence of the input beam. In so doing, however, the intensity of the exiting beams will become non-uniform.

It is therefore an object of the present invention to provide a new and improved collimated beam manifold wherein the above described limitations and deficiencies in the prior art are overcome or substantially reduced.

DISCLOSURE OF INVENTION

The present invention provides an optical manifold comprising an optical substrate coated on its rear surface with a fully reflecting layer, and on its front surface with a partially reflecting layer whose reflectivity is spatially dependent such that a reflectivity gradient exists on the front surface. The partially reflecting layer is of non-uniform thickness, the reflection of the layer at a give location on the front surface being proportional to the thickness of the layer at such location. As a consequence, the layer on the front surface has a thickness gradient in the same direction as the reflectivity gradient.

An input collimated beam entering the rear surface and impinging on the front surface will be reflected recursively between the front and rear surfaces. The input beam and the multiple reflections resulting therefrom define a plane perpendicular to the front and rear surfaces. When the plane intersects the surfaces along a line substantially parallel to the reflectivity gradient, and the direction of propagation of the multiple reflections is opposite to this gradient, a plurality of parallel beams will emerge through the front surface of the manifold. The intensity of these emerging beams will have a relationship that depends on the relative thickness of the layer on the front surface at the points where the beams emerge. By functionally varying the thickness of the layer on the front surface at the points of encounter with the beam reflected from the rear surface, the intensities of the beams emerging from the front surface of the manifold will be uniform or have a predetermined ratio.

The thickness gradient in the layer on the front of the substrate is established by providing a plurality of steps of different thicknesses. If emerging beams of equal intensity are desired, the relationship between the reflectivity of the layer intercepted by the ith beam to the reflectivity of the layer intercepted by the i+1st beam (measured in a direction opposite to the direction of propagation is: $R_{i+1} = 1/(2-R_i)$. That is to say, if $R_i = 0$, then $R_{i+1} = 0.5$ which is a condition where the ith beam exits the front surface at a point where there is no coating. The preceeding i+1st beam exits from the surface at a point where the reflectivity is 0.5. The reflectivity at the point where the i+2nd beam emerges would be 0.67, etc.

In order to provide a simple way in which to change the number of beams emerging from the manifold without changing the angle of the emerging beams, the fully reflective coating on the rear surface of the manifold should only partially cover the rear surface but should overlie the coating on the front surface. The dividing line between the coated and uncoated portions of the rear surface should be non-parallel and preferably 45° to the reflectivity gradient on the rear surface. With this arrangement, the manifold is arranged relative to the source of a collimated beam such that the point of incidence of the beam on the rear surface will be along the line dividing the coated portion of the rear surface from the uncoated portion. The number of beams emerging from the manifold will then be dependent upon the position along the line at which the collimated beam is incident. In order for the intensity of the exiting beams to remain unchanged when the number of beams is reduced in the manner described above, the intensity of the incident beam must be attenuated.

BRIEF DESCRIPTION OF DRAWINGS

An embodiment of the invention is disclosed in the accompanying drawings wherein:

FIG. 1 is a perspective view of an optical manifold in accordance with the present invention with portions broken away; and FIG. 2 is a cross sectional view of manifold of the present invention, the manifold being inverted from the view shown in FIG. 1.

BEST MODE FOR CARRYING OUT THE INVENTION

Referring now to FIG. 1 reference numeral 10 designates an optical manifold according to the present invention for transforming an incident collimated beam into a plurality of emerging beams that are parallel and of uniform intensity. The manifold includes optical substrate 12 which is generally flat and rectangular and which can be formed of glass, fused quartz, sapphire, or any other material which is effectively transparent to the incident beam. The optical substrate includes rear and front surfaces 13 and 15 respectively, each being of optical quality; and a plurality of sides 16, 17, 18, and 19 which need not be of optical quality.

Rear surface 13 of the substrate is partially covered with totally reflective coating 14, the portion of surface 13 devoid of coating being designated by reference numeral 13a. Coating 14 may be metallic, (e.g. aluminum, silver, gold, etc.) or may be a dielectric as is well-known in the art. Collimated beam 30 may enter the substrate at any point within uncoated portion 13a; and, as explained below, the number of exiting beams can be varied by changing the entry point of the incident beam.

Front surface 15 of the substrate is provided with partially reflective coating 20 which may be metallic or dielectric. Coating 20 has a reflectivity gradient whose direction is indicated by arrow A in FIG. 1. That is to say, the reflectivity of coating 20 in the vicinity of side 18 is greater than the reflectivity of the coating adjacent side 16. There is no reflectivity gradient transverse to the direction of arrow A.

One way in which to achieve a reflectivity gradient is to vary the thickness of coating 20. Relatively thicker portions of the coating have a greater reflectivity than relatively thinner portions, which is to say that a thinner portion allows a greater percentage of a beam incident on the front surface to pass therethrough than a thicker portion. As a consequence of this arrangement, coating 20 has a thickness gradient which is in the same direction as the reflectivity gradient.

The preferred arrangement for achieving the reflectivity gradient is to provide a plurality of steps of different thickness such as steps 22, 24, 26, and 28 in coating 20. Step 22 is the thickest step and step 28 is the thinnest. While five steps are shown in the drawing, it should be obvious that more or less steps can be provided in accordance with the maximum number of output beams required. As shown in FIG. 1, coating 14 on rear surface 13 of the manifold only partially covers this surface, line 51 representing the dividing line between the coated and uncoated portions of the rear surface. As shown, coating 14 overlies each of the steps 22, 24, 26, 28 on the opposite surface of the manifold. In addition, line 51 lies inclined relative to the reflectivity gradient, at an angle of 45°.

Referring now to FIG. 2, incident beam 30, which is highly collimated and may be a laser beam, is injected into substrate 12 through the uncoated portion 13a of the rear surface adjacent line 51 close to the side 18. The rear surface must be of good optical quality but to illustrate the actual situation, a low order reflection indicated by arrow 31 results. Most of the radiation in beam 30 passes through optical substrate 12 as indicated by beam 32 and impinges on the front surface 15 where coating 20 is thickest, namely at step 22, where the reflectivity is designated $R_5$. A portion of the impinging beam, indicated by reference numeral 33, is reflected by step 22; and the remainder of the radiation, indicated by reference numeral 42, exits through the coating. Reflected beam 33 impinges on rear surface 14; and fully reflective coating 14 directs the radiation in beam 33 back towards front surface 15 as indicated by beam 34. This beam impinges on front surface 15 at step 24 which is less thick than step 22 and has a reflectivity of $R_4$ where $R_4 < R_5$. On a percentage basis, a greater proportion of the radiation in beam 34 exits from the front surface than beam 32 because step 24 is thinner than step 22. Thus, some of the radiation in beam 34 exits from the front surface as beam 44 which will be parallel to beam 42, and the remainder of the radiation is reflected back towards rear surface 13 as beam 35.

The process described above is repeated as beam 36 impinges the front surface where step 26 is located. This step is thinner than step 24 and has a reflectivity $R_3$ where $R_3 < R_4$, with the result that the percentage of the radiation in beam 36 which exits from the manifold is greater than the percentage of radiation in beam 34 which exits from the manifold. Some of the radiation in beam 36 will exit from the front surface as beam 46 which is parallel to beams 42 and 44. The balance of radiation in beam 36 exits as beam 46 which is reflected as beam 37 towards the rear surface. Upon reflection, beam 38 is produced which impinges on the front surface at step 28 which is thinner than previous step 26, and has a reflectivity of $R_2$ where $R_2 < R_3$. As indicated previously, a portion of the radiation in beam 38 exits as beam 48 and the balance is contained in beam 39 which is directed towards the rear surface. Upon reflection, beam 40 is produced which impinges on front surface 15 in a region where there is no coating (i.e., $R_1 = 0$); and the beam emerges as beam 50.

All of the beams 42, 44, 46, 48 and 50 are parallel and uniformly spaced. Furthermore, incoming beam 30 together with the multiply reflected beams 32–40 and the exiting beams lie in a plane perpendicular to the front and rear surfaces of the manifold, the plane being parallel to the reflectivity gradient. Depending upon the width of the steps, a certain amount of skewing of this plane relative to the reflectivity gradient can be tolerated without adversely affecting the ratio of intensities of the emitted beams or their parallel nature.

In order for the intensities of the emitted beams to be equal, the reflectivity of coating 20 at the points where the beam emerges from the front surface must have a particular spatially dependent functional relationship. The recursion formula relating the reflectivity of points on the front surface of the manifold at which adjacent beams emerge from the manifold is as follows:

$$R_{i+1} = 1/(2 - R_i) \quad (1)$$

where $R_i$ is the reflectivity of the surface at the point where the ith reflected beam is incident on the front surface of the manifold, and $R_{i+1}$ is the reflectivity of the front surface where the i+1st beam is incident, where the index i runs in the direction opposite to the direction of propagation of the multiple reflections. For the five beam arrangement shown in the drawing, the reflectivity $R_1$ at the point on the surface where beam 50 emerges is zero inasmuch as there is no coating on this point. The reflectivity $R_2$, $R_3$, $R_4$ and $R_5$ at the at the points where beams 48, 46, 44 and 42 emerge from the front surface is ½, ⅔, ¾, and 4/5 respectively. In general, for n output, beams, the reflectivity at the exit of each beam should be:

$$R_n = (n-1)/n \quad (2)$$

In general, if the ratio of the intensities other than uniform is $k_{i+1}/k_i$, where $k_{i+1}/k_i$ is the ratio of intensities of the i+1st and the ith beams respectively, the recursion formula of Eq. (1) reduces to:

$$R_{i+1} = 1/[(k_{i+1}/k_i)(1 - R_i) + 1] \quad (3)$$

The spacing S of the outgoing of the emerging beams is related to the substrate thickness d, the index of refraction $n_R$ and the angle of incidence $\theta$ of the incoming beam by the following equation:

$$S = (2d)(\sin\theta)(\cos\theta)/[n_R^2 - \sin^2\theta]^{\frac{1}{2}} \quad (4)$$

In order to change the number of beams emerging from the front surface of the manifold, the point of entry of the incident beam on uncoated portion 13a of the rear surface is shifted along the diagonal 51 which divides the coated region from the uncoated region. Specifically, by moving the point of entry from along the diagonal line 52 from X1 to the point X2, as shown in FIG. 1, the number of beams emitted will be reduced from five to two. In order for the intensities of the two output beams to be the same as the intensitities of the five output beams, the intensity of the incident input beam must be reduced. Specifically, the intensity must be reduced 2/5.

Eq. (3) accounts for the final reflectance $R_1$ at the exit of the last beam from the manifold, but it does not include the effect of absorption within substrate 12 or at the interface between the substrate and the reflective coatings. If such effect is uniform across the face of the substrate and is accounted for by the parameter t, then the reccursion formula of Eq. (1) can $$R_{i+1} = 1/[1 + (1 - R_i)t] \quad (5)$$

If the beam intensities exiting from the manifold must have the ratios $k_1: k_2:k_3 \ldots k_n$, then the formula can be expressed:

$$R_{i+1} = 1/[(k_{i+1}/k_i)t(1 - R_i) + 1] \quad (6)$$

It is believed that the advantages and improved results furnished by the method and apparatus of the present invention are apparent from the foregoing description of the preferred embodiment of the invention. Various changes and modifications may be made without departing from the spirit and scope of the invention as described in the claims that follow.

We claim:

1. An optical manifold comprising:
   an optical substrate having front and rear surfaces;
   a fully reflecting coating on the rear surface;
   a partially reflecting coating on the front surface establishing a reflectivity gradient thereon;
   said fully reflective coating partially covers the rear surface, and the dividing line between the fully reflecting coating and uncoated portion on the rear surface is approximately 45° to the reflectivity gradient.

2. An optical manifold according to claim 1 wherein the partially reflecting coating is of non-uniform thickness defining a thickness gradient, the reflectivity of the coating at a given location on the front surface being proportional to the thickness of the coating at such location, whereby the thickness gradient is in the same direction as the reflectivity gradient.

* * * * *